US007127104B2

(12) United States Patent
Prasad et al.

(10) Patent No.: US 7,127,104 B2
(45) Date of Patent: Oct. 24, 2006

(54) VECTORIZED IMAGE SEGMENTATION VIA TRIXEL AGGLOMERATION

(75) Inventors: Lakshman Prasad, Los Alamos, NM (US); Alexei N. Skourikhine, Los Alamos, NM (US)

(73) Assignee: The Regents of the University of California, Los Alamos, NM (US)

( * ) Notice: Subject to any disclaimer, the term of this patent is extended or adjusted under 35 U.S.C. 154(b) by 237 days.

(21) Appl. No.: 10/887,424

(22) Filed: Jul. 7, 2004

(65) Prior Publication Data

US 2006/0008144 A1 Jan. 12, 2006

(51) Int. Cl.
*G06K 9/00* (2006.01)
*G06K 9/34* (2006.01)

(52) U.S. Cl. ............... 382/164; 382/173; 382/197; 382/199; 382/241; 358/538

(58) Field of Classification Search ................ 382/164, 382/173, 176, 190, 199, 197, 203, 241, 242, 382/253, 260; 358/538
See application file for complete search history.

(56) References Cited

U.S. PATENT DOCUMENTS

| | | | | |
|---|---|---|---|---|
| 6,034,691 | A * | 3/2000 | Aono et al. ............. | 345/582 |
| 6,393,159 | B1 | 5/2002 | Prasad et al. | |
| 6,593,976 | B1 * | 7/2003 | Lord ..................... | 348/731 |
| 6,614,930 | B1 * | 9/2003 | Agnihotri et al. ........ | 382/176 |
| 2004/0070586 | A1 * | 4/2004 | Taubin ................... | 345/423 |

OTHER PUBLICATIONS

Alexei Skourikhine, and Lakshman Prasad, "A Method for Contour Extraction for Object Representation," patent application, U.S. Appl. No. 10/388,680, filed Mar. 14, 2003.
John Canny, "A computational Approach to Edge Detection," IEEE Transactions on Pattern Analysis and Machine Intelligence, vol. PAMI-8, No. 6, pp. 679-698, Nov. 1986.
Jonathan Richard Shewchuk, "Triangle: Engineering a 2D Quality Mesh Generator and Delaunay Triangulator," School of Computer Science, Carnegie Mellon University, Pittsburgh, PA 15213, irs@cmu.edu., pp. 1-10.

* cited by examiner

*Primary Examiner*—Sanjiv Shah
*Assistant Examiner*—Ali Bayat
(74) *Attorney, Agent, or Firm*—Mark N. Fitzgerald; Ray G. Wilson

(57) ABSTRACT

A computer implemented method transforms an image comprised of pixels into a vectorized image specified by a plurality of polygons that can be subsequently used to aid in image processing and understanding. The pixelated image is processed to extract edge pixels that separate different colors and a constrained Delaunay triangulation of the edge pixels forms a plurality of triangles having edges that cover the pixelated image. A color for each one of the plurality of triangles is determined from the color pixels within each triangle. A filter is formed with a set of grouping rules related to features of the pixelated image and applied to the plurality of triangle edges to merge adjacent triangles consistent with the filter into polygons having a plurality of vertices. The pixelated image may be then reformed into an array of the polygons, that can be represented collectively and efficiently by standard vector image.

10 Claims, 3 Drawing Sheets
(1 of 3 Drawing Sheet(s) Filed in Color)

VECTORIZED IMAGE SEGMENTATION VIA TRIXEL AGGLOMERATION

STATEMENT REGARDING FEDERAL RIGHTS

This invention was made with government support under Contract No. W-7405-ENG-36 awarded by the U.S. Department of Energy. The government has certain rights in the invention.

COMPUTER PROGRAM COMPACT DISK APPENDIX

One embodiment of the present invention is contained in the computer program compact disk, two copies of which are attached. The contents of the compact disk are incorporated by reference herein for all purposes.

| NAME | SIZE | DATE CREATED | DATE MODIFIED |
|---|---|---|---|
| VISTA_SW | 76.7 MB | Jun. 29, 2004 | Jun. 29, 2004 |
| VISTA.m | 36 KB | Jun. 28, 2004 | Jun. 30, 2004 |
| VISTA_bin | 76.3 MB | Jun. 29, 2004 | Jun. 29, 2004 |
| VISTA | 28 KB | Jun. 29, 2004 | Jun. 29, 2004 |
| VISTA.ctf | 304 KB | Jun. 29, 2004 | Jun. 29, 2004 |
| README | 1 KB | Jun. 29, 2004 | Jun. 29, 2004 |
| MCRInstaller | 78 MB | May 10, 2004 | |
| VISTA_aux | 399 KB | Jun. 22, 2004 | |
| CAT | 199 KB | Jun. 22, 2004 | |
| Cat | 11 KB | Jun. 1, 2002 | Jun. 28, 2004 |
| Cat | 8 KB | Jun. 1, 2002 | Jun. 28, 2004 |
| CAT-softdoc | 86 KB | Nov. 14, 2002 | Jun. 22, 2004 |
| Cattrans | 19 KB | Jun. 1, 2002 | Jun. 28, 2004 |
| DContour | 17 KB | Jan. 5, 2002 | Jun. 28, 2004 |
| Dcontour | 5 KB | Jan. 5, 2002 | Jun. 28, 2004 |
| stack | 3 KB | Jan. 5, 2002 | Jun. 28, 2004 |
| StringNorm | 53 KB | Aug. 1, 2002 | Jun. 28, 2004 |
| StringNorm | 3 KB | Aug. 1, 2002 | Jun. 28, 2004 |
| NICEDRAA | 64.9 KB | Jun. 22, 2004 | |
| Dcontour | 17 KB | Jan. 5, 2002 | Jun. 28, 2004 |
| Dcontour | 5 KB | Jan. 5, 2002 | Jun. 28, 2004 |
| NICEDRAA-softdoc | 44 KB | Aug. 7, 2003 | Jun. 22, 2004 |
| CAT-softdoc | 86 KB | Nov. 14, 2002 | Jun. 22, 2004 |

The contents of the compact disks are subject to copyright protection. The copyright owner has no objection to the reproduction of the contents of the compact disk from the records of the U.S. Patent and Trademark Office, but otherwise reserves all copyright rights whatsoever.

FIELD OF THE INVENTION

The present invention relates generally to image processing and understanding, and, more particularly, to the application of triangulation to image processing and understanding.

BACKGROUND OF THE INVENTION

Image segmentation is the first and perhaps the most critical image processing step to automating image understanding by computers. Segmentation consists of decomposing an image into its constituent salient features and objects that define the semantic content of the image. Image segmentation sets the stage for object detection and recognition by providing a high-level representation of an image in terms of regions of uniform color/intensity and geometric regularity.

Objects in images are typically contiguous subsets of such regions. Thus, image segmentation transforms an image from a low-level pixel-based representation to an intermediate-level region-based representation that enables the piecing together of the 'jigsaw puzzle' of regions into individual objects of the image. Image segmentation can be thought of as representing the method of perception in human vision. This representation does not assume a priori knowledge of the objects in an image; rather it uses local regularities and structure in an image to parse the image into distinct parts.

There has been no universally applicable method to date that can segment all images equally well. Although there are several segmentation methods developed over the decades, almost all can be classified, broadly speaking, into one of two categories: 1) methods that seek structure by decomposing an image into regions of uniform color or intensity, generally assuming that, to a large extent, parts of an object are dominated by one color; 2) methods that seek structure by identifying parts of an image that exhibit rapid change in color/intensity, generally assuming that boundaries of objects are sites of such rapid change in intensity.

Digital images are made up of pixels of subtly varying intensities that are dithered in such a way as to produce the effects of shade and gradation of color. Since methods of the first kind rely on binning pixels into fewer classes, this in general results in speckle noise due to neighboring pixel differences being enhanced. It also has the effect of marring edges that have more gradual variation in intensity across them, or creating false edges due to gradual variation in intensity across a region. While methods of the second kind do produce edges that belong to object boundaries, these edges are typically fragmented and as such do not bear any relationship to one another. Thus, additional work is required to group and interrelate edges belonging to the same object.

Various objects, advantages and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

SUMMARY OF THE INVENTION

In accordance with the purposes of the present invention, as embodied and broadly described herein, the present invention includes a computer implemented method for segmenting a pixelated image formed of pixels having color values by transforming the pixelated image into a vectorized image specified by a plurality of polygons.

A particular embodiment of the present invention includes a computer implemented method for segmenting a pixelated image formed of pixels having color values. The image is processed to extract edge pixels that separate different colors in said pixelated image and a constrained Delaunay triangulation of the edge pixels is performed to form a plurality of triangles having edges that cover the pixelated image. A color for each one of the plurality of triangles is determined from the color pixels within each triangle. A filter is formed that has a set of grouping rules related to features of the pixelated image and applying to the plurality of triangle edges to merge adjacent triangles consistent with the filter into polygons having a plurality of vertices. In some application, the pixelated image is then reformed into an array of the polygons that form a compressed data set for representing the image.

BRIEF DESCRIPTION OF THE DRAWINGS

This patent or application file contains at least one drawing executed in color. Copies of this patent or patent application publication with color drawing(s) will be provided by the Office upon request and payment of the necessary fee.

The accompanying drawings, which are incorporated in and form a part of the specification, illustrate embodiments of the present invention and, together with the description, serve to explain the principles of the invention. In the drawings.

DETAILED DESCRIPTION

Figure 1A:
FIG. 1 is a pictorial illustration of the image transformation steps in accordance with an embodiment of the present invention.

Existing segmentation methods typically generate a pixelated image, only using fewer colors than the original. Thus, extracting structures from the segmented image is generally not addressed. In accordance with the method of the present invention, a digitized (i.e., pixelated) image is transformed into a vectorized image, wherein the objects of interest are readily obtained at a higher level of representation as attributed polygons. Vectorizing an image involves the representation of an image in terms of geometric primitives, such as points, straight lines, polygons, and arcs, and their relative positional arrangements, along with attributes such as spectral values, intensity, and the like. In contrast, a digitized image uses pixels arranged in a grid as primitives to represent the image.

Vectorization helps to explicitly delineate complex structures and allow the direct scaling of images without loss or change of image quality. The selective processing and manipulation of individual structures is thereby enabled to provide a higher level description of images that is adaptable to individual image characteristics. The image can then be manipulated in terms of its constituent structures. This is a significant gain from the point of view of understanding an image, where the goal is to automatically comprehend a scene in terms of the objects present in the scene and their interrelationships.

A key strength of the invention is that the method not only provides a high performance segmentation algorithm that is applicable to a broad class of imagery, but it also provides a framework for evolving new algorithms that are improvements or specializations of existing algorithms. This can be achieved by several means. Indeed, one can use the frameworks of neural networks or genetic algorithms to arrive at sophisticated filters that are better suited for segmenting special classes of imagery such as satellite imagery, biomedical imagery, night vision/X-ray/IR imagery, and the like, under the algorithmic framework constituting the method of the invention. Thus, the method of the present invention is not a single image segmentation procedure, but rather a segmentation scheme that has the flexibility to produce either a specialized method for a particular class of images or a general method that performs reliably on a wide variety of images. In contrast, most segmentation algorithms to date are best adapted to a specific class of imagery, and perform poorly in the case of general imagery.

A fundamental reason for these differences is that existing segmentation algorithms are pixel classifiers. Pixels are a byproduct of the sensing mechanism and are not sensitive to special characteristics of a particular image. On the other hand, the method herein eliminates pixel-based representation and creates image-adapted units of description, herein "trixels", which are well adapted to capture local as well as global image geometry and characteristics. The method uses algorithms and methods that are optimal and linear in the number of edge pixels, which is far less than the total number of pixels in the image.

The method of the present invention exploits the structural and spectral features in an image to isolate polygonal regions that collectively and completely tile (i.e., fill) the image. These polygonal regions conform to the salient edges inherent in the image, thus preserving the boundaries in the image. Each polygonal region is assigned a color (intensity and/or spectral values) that corresponds to the average color of the underlying portion of the image. In effect, the invention provides a method of approximating a pixelated digital image by a vectorized polygonal tiling of the image. Moreover, the polygons have spectral and structural attributes that enable further grouping of these polygons into subsets that represent objects in the image.

Figure 1B:
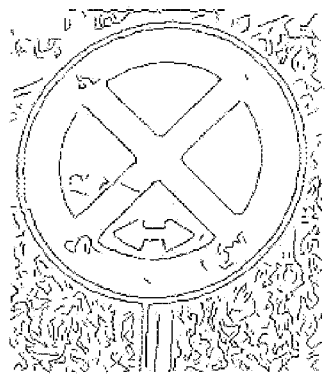
Figure 1C:
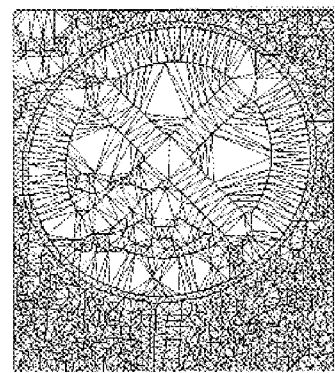
Figure 1D:
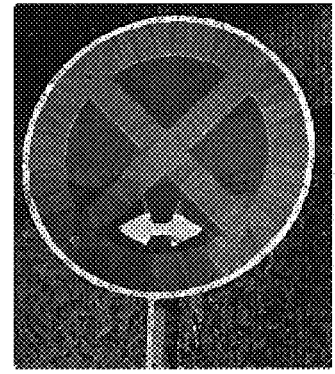

The Algorithm Scheme:

Briefly, in this invention, contours comprised of pixel chains are extracted (FIG. 1B) from a digital image (FIG. 1A) and used as an initial incomplete set of feature primitives. A constrained Delaunay triangulation is applied to the planar straight line graph (PSLG) defined by these contours (FIG. 1C), with the resulting triangle vertices anchored at contour pixels and with no triangle edge crossing a contour. The edges of the triangles establish correspondences between contours bounding the same region, while the triangles define elements of regions flanked by these contours. The triangles are used to sample the image for spectral (color/intensity) attributes (FIG. 1D) which, in conjunction with the adjacency information of triangles, and local contour correspondences determined by triangle edges, are inputs to perceptual grouping filters that determine whether two adjacent triangles should be merged along their common edge.

Thus, in general, whenever a triangle edge is deleted (due to merging of two triangles) two regions are connected into a single region. Likewise, whenever a triangle edge is retained two contours are connected into a single contour, with the retained triangle edge serving as the interpolating contour element. The effective action of the perceptual grouping filters is to determine whether each triangle edge is to be deleted or retained. Each such determination results in either a region continuation or a contour continuation. The edges of the Delaunay triangulation thus act as switches that explicitly model and control the region-contour duality in the perceptual organization of low-level features.

Figure 1E:
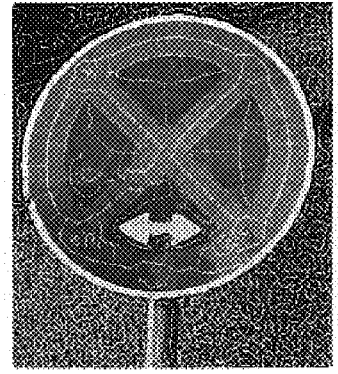
Figure 1F:
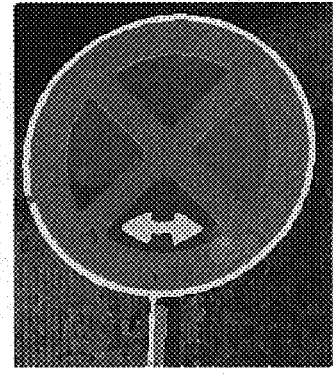

It is important to note that neither pixels nor edges are used as feature primitives for perceptual organization. Instead, triangles attributed with spectral values representative of the region they cover are used, and the (indices of) contours they span. These hybrid region-contour feature elements are called herein TRIangular eXcision ELements, or trixels. The trixels are represented as the vertices of a grouping graph (FIG. 1E), with two adjacent trixels connected by an edge in the graph if their common edge is determined to be deleted by the perceptual grouping filters. The merging of trixels belonging to each connected component of the grouping graph results in a polygonal segment of the image. The polygonal regions resulting from the perceptual grouping of trixels conform to the image edges as well as to the spectral uniformity of image regions (FIG. 1F).

Figure 2:
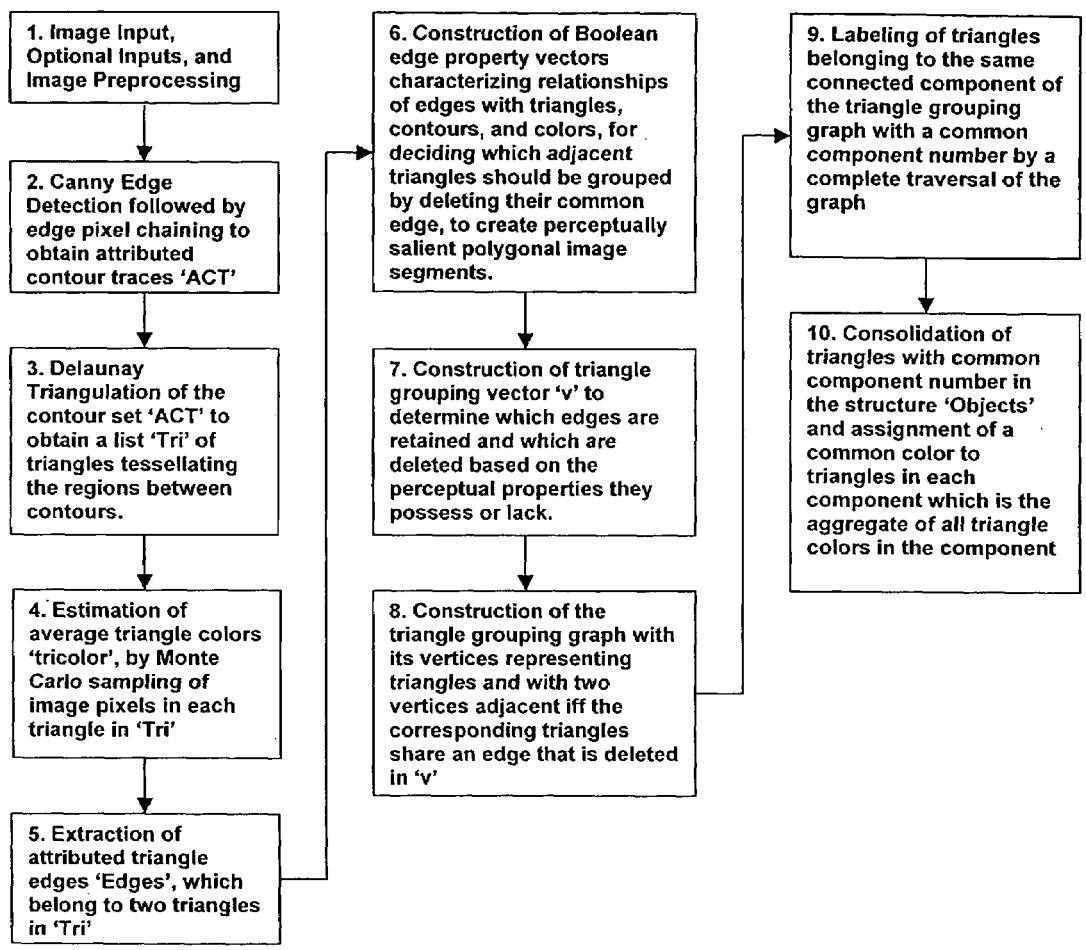
FIG. 2 is a flow chart of one embodiment of the present invention.

FIG. 2 depicts a flow diagram of an exemplary method for processing pixelated image data according to the method of the present invention. Since digital data is being processed, it is expected that the data will be processed by a software implemented method that is performed by a general purpose computer or implemented in firmware as appropriate. For each method step discussed below, an implementation of the step in Matlab is set out in the computer disk appendix, where MatLab is a publicly available program language.

At Step 1, pixelated image data is input to a computer and preprocessed to prepare the image data for further processing. Preprocessing, for example, may be done to sharpen the image, to filter one or more characteristics of the image, and to obtain an appropriate grayscale representation for edge detection, as described below. As used herein, the term "color" refers to intensity values, grayscale values, and/or spectral values such as red, green, and blue (R, G, B).

Vectorized polygonal decomposition of a digital image is performed by first extracting edge pixels by means of an edge detection procedure at Step 2, with edge pixel chaining to output attributed contour traces (herein "ACT"). A preferred edge detection procedure is the well-known Canny edge detector (J. Canny, "A Computational Approach to Edge Detection," IEEE Trans. on Pattern Analysis and Machine Intelligence, Vol. 8, No. 6, November 1986), incorporated herein by reference.

The Canny operator works in a multi-stage method. First, the image is smoothed by Gaussian convolution. Then a simple two-dimensional first derivative operator (gradient) is applied to the smoothed image to highlight regions of the image with high first spatial derivatives, i.e., large gradients in the grayscale. Edges give rise to ridges in the gradient magnitude image. The algorithm then tracks along the top of these ridges and sets to zero all pixels that are not actually on the ridge top while setting to one the values of pixels on the ridge tops to yield a thin line in the binary output image of edge pixels. The efficient extraction of polygonal contour chains from the edge pixel image may be achieved, for example, by NICEDRAA (see U.S. patent application Ser. No. 10/388,680), incorporated herein by reference for all purposes).

The resulting contour chains correspond to boundaries between regions of different color spectral/intensity values (i.e., spectral signature). Color spectral and intensity values are in lieu of each other. Grayscale images have no color spectral values, and regional variations are depicted by varying intensities of gray, ranging from black to white. Color spectral images, on the other hand, have a triple (e.g., red, green, blue) of basic colors associated with each color that also (implicitly) determines how bright or dark that color appears. The "difference" between adjacent regions of color spectral/intensity values (herein referred to collectively as "color") is a parameter set in the Canny operator that determines the resolution of the contour chains.

Next, a Delaunay triangulation of the set of contour chains is performed at Step 3 such that no triangle edge crosses an edge of a contour chain. Such a triangulation is known as a constrained Delaunay triangulation (CDT). Since the edge detection procedure is expected to provide all the salient edges in the image, each triangle of the CDT can be assumed to cover an area of the image that is relatively uniform in spectral values. The formation of the CDT of the set of edge pixels can be done using publicly available software, such as J. R. Shewchuk, "Triangle: Engineering a 2D Quality Mesh Generator and Delaunay Triangulator," *Association for Computing Machinery, First Workshop on Applied Computational Geometry* Philadelphia, Pa., pp 124–133, May 1996, incorporated herein by reference.

Each of these triangles is used as a mask within which the pixels of the original image are sampled at Step 4 for gray scale intensity (between 0 to 255) or their red-green-blue (RGB) color values using a Monte Carlo technique to estimate the mean intensity over the triangle region. The average intensity or the average color (averaged across R, G, and B, individually) of all the sampled pixels in a triangle is the mean intensity/color attributed to the triangle. Note that the median value could also be used, but the computation is more computationally expensive. The triangle is then assigned this mean value of intensity. Thus, each triangle in the CDT of an edge image is attributed with a color.

Herein, an attributed triangle in the CDT of the edge pixel set of an image, as described above, is called a 'triangular excision element' or "trixel". The image will be cut or excised at Step 5 along the edges of these trixels to obtain the desired polygonal decomposition of the image. This recasting of a pixelated image in terms of trixels adapts the image's representation to the features of the image, while at the same time vectorizing the image. The number of trixels constituting an image is a function of the image's complexity, and not its size (in pixels) per se.

The vectors that characterize the image at this stage are specified as follows:

$$(X_{i1}, Y_{i1}, X_{i2}, Y_{i2}, X_{i3}, Y_{i3}, C_i), \text{ where } i=1, \ldots, N,$$

where N is the number of triangles in the triangulation, the numbers $X_{i1}$, $Y_{i1}$, $X_{i2}$, $Y_{i2}$, $X_{i3}$, $Y_{i3}$ are the X and Y coordinates of the three vertices of the ith triangle and $C_i$ is the quantized mean intensity (an integer between 0 and 255) or the quantized mean color (a triple of integers in the range 0–255, one for each primary color).

Thus, an image that has been decomposed into N triangles is represented by N vectors, each with 9 or 7 components, depending upon whether it is a 24 bit or 8 bit image. Note that the number N is at most three times the number of edge pixels, which is typically a small fraction of the total number of pixels in an image, so that the image representation is, in general, compressed.

In accordance with the present invention, selected contiguous subsets of triangles are subsequently merged during Steps 6–10 to yield a representation that is more compressed and provides significant information, i.e., a representation that is tuned to natural object and region boundaries. The merged triangles yield a number of vectorized polygons represented as a sequence of variable length vectors of the form:

$$(X_{i1}, Y_{i1}, X_{i2}, Y_{i2}, \ldots, X_{ini}, Y_{ini}, C_i), i=1 \text{ to } M,$$

where ni is the number of vertices of the ith polygon, M is the number of polygons partitioning the image, the numbers $X_{ik}$, $Y_{ik}$ are the X and Y coordinates of the kth vertex of the ith polygon and $C_i$ is the quantized mean intensity/color of the triangles of the ith polygon. Here, M is much less than the number of triangles N, and vertices of triangle edges separating triangles of the same color are represented only once.

It will be appreciated that the above representation is exemplary and the vector information can be represented in a number of equivalent ways; e.g., accepted universal standards such as SVG (scable vector graphics) formats proposed by the World Wide Web Consortium.

The trixel representation of an image is the precursor for performing trixel grouping to obtain a polygonal segmentation of the image. The edges of the trixels that are shared by two trixels are evaluated at Step 6 for various structural properties. For each property, an edge is assigned a Boolean value at Step 7:1 if the edge possesses the property, 0 otherwise. A composite filter that is a Boolean expression involving the individual property filters determines the retention of the edge as an edge of a polygon. Alternately, an edge may be assigned a numerical weight in some range or scale based on how well it satisfies a given property. A composite filter comprising individual filters corresponding to various properties may then be implemented by prescribing an appropriate cumulative weight for an edge that is based on its weights with respect to each individual property filter. For purposes of the methodology of the present invention, Boolean filters are used in an exemplary method.

Some exemplary individual properties listed below that are embodied by the filters are based on perceptual criteria used by the human visual system to group structures and features, particularly adapted to trixel geometry.

The four broad categories of perceptual criteria considered in the exemplary implementation of the method herein are:

1) Spacial Proximity: If the edge of a trixel is too long with respect to a certain measure (e.g., more than 2.5 times the median length of the contour chains) or is not the shortest edge of either trixel to which it belongs, then the corresponding trixels are candidates for being grouped into a single polygon. This is implemented via the Boolean filters "TooLong", "NotShortest", and "Longest". The spacial proximity property ensures that triangle edges connecting contour chains that are not proximate enough to be related are not retained as interpolations between contour chains. In other words, it ensures that proximity is not violated while linking contour chains in search of contour interpolations and completions.

2) Spectral Proximity: If a trixel edge borders two trixels that have closely matching colors (based on a pre-assigned distance threshold), then the trixels are grouped. For grayscale images, intensities are rescaled to range from 0 to 1 and a scalar threshold in this interval is used as a threshold for evaluating proximity of intensities of adjacent trixels. For color (RGB) images, color vectors are normalized to have unit length and the cosine of the angle between two normalized color vectors of adjacent trixels is computed to determine their spectral proximity. The closer the cosine is to 1, the closer the colors of the adjacent triangles. A predetermined threshold between 0 and 1 is used and trixels whose unit color vectors form an angle whose cosine is greater than this threshold are considered to have closely matching colors. This is implemented as the Boolean filter "NearColor".

3) Contour Continuity: This set of properties ensures that a) trixel edges that coincide with Canny edges are retained, as these correspond to edges of objects and features in an image; b) trixel edges that connect a contour chain endpoint with the interior point of another contour chain are preserved, as they indicate the transversality of two object contours that typically is a hallmark of occlusion in images; and c) trixel edges connecting contour chains end to end are preserved as these serve to continue Canny contours to yield more complete object contours. These properties are implemented by the Boolean filters "Canny", "EndLink1", and "EndLink2", respectively.

4) Region Continuity: If a trixel edge belongs to two trixels that have all their vertices belonging to the same or same pair of contour chains, then the trixels are grouped. This is implemented via the Boolean filters "SameRegion" and "Jus2Regions". This property filter ensures that a homogeneous region of the image is not partitioned into two by a trixel edge. A trixel edge that belongs to a trixel that has its vertices on three different contour chains is, on the other hand, a potential boundary edge separating two regions. This edge is preserved provided it satisfies other properties as well. The detection of such an edge is implemented by the Boolean filter "Junction".

The above are pure criteria that dictate grouping of two trixels in the absence of other criteria. However, the actual grouping of two adjacent trixels is dictated by a composite Boolean filter that incorporates the above filters in a complex Boolean expression.

One such composite filter used in the implementation of the invention herein is:

v=(TooLong|NotShortest&~EndLink2)
|Longest|NearColor|SameContour|jus2Contours|
(Junction&NotShortest))&~(~TooLong&Canny|
((EndLink1|EndLink2) &~Longest))).

Here, the symbols "|", "&", and "~" interspersing the Boolean filters described above are the logical conjunction ("or"), disjunction ("and"), and negation ("not"), respectively.

If v=1 for a trixel edge, then the adjacent trixels are grouped, else they are kept separate. An equivalent composite filter expression may be defined for non-Boolean filter values, using, e.g., algebraic functions to combine filters. Thus, the filter v determines how trixels are merged in Steps 8–10 to form polygons with uniform color attributes based on structural interactions of trixels and their edges with contour chains.

In addition to designing various composite filters v to dictate trixel grouping, there are other structural criteria known to be employed by human vision to achieve perceptual grouping of image regions that may be implemented via trixel merging herein or that may be incorporated to enhance or modify the segmentation quality or purpose. The method of the present invention lays out a broad algorithmic scheme to achieve such segmentation algorithms.

The trixels can be thought of as the vertices of a grouping graph in Step 8 with two vertices connected by an edge if and only if the corresponding trixels are grouped. The connected components of the resulting graph correspond to polygons resulting from the grouping method implemented by the filter, v. This connected component extraction is implemented in Step 9 by well-known graph depth first search (DFS) traversal of the grouping graph.

A key strength of the method herein is that it not only provides a high performance segmentation algorithm that is applicable to a broad class of imagery, but it also provides a framework for evolving new algorithms that are improvements or specializations of the existing algorithms. This can be achieved by several means. Indeed, one can use the frameworks of neural networks or genetic algorithms to arrive at sophisticated composite filter vectors, v, which are complex combinations of elementary filter vectors that are adapted for segmenting special classes of imagery such as satellite imagery, biomedical imagery, night vision/X-ray/IR imagery, and the like, under the algorithmic framework of the method of the present invention.

The result of the above described procedure is an array of polygons given by grouped subsets of trixels along with the average color/intensity of the trixels constituting the polygon as its color/intensity attribute. There is now sufficient information in each of the polygons to extract all its properties completely for further merging of polygons into objects, or recognition of objects.

The above procedure forms an object-based decomposition of an image that yields a higher level of description than the original pixel-based digital format obtained by an imaging sensor.

This procedure is currently implemented in MatLab and is operable in various versions of MatLab (MatLab M-files: ImSeg, ImSeg2, ImSeg3, ImSeg4, ImSeg4c2, Imseg5, ImSegFY04, ImSeq pat3, VISTA, Cannyedges, ContourChains, ConnComp). A MatLab program is provided in the computer disk appendix. It is expected that the method will be implemented into C++ code for efficiency, portability, and use with other applications.

Figure 3:
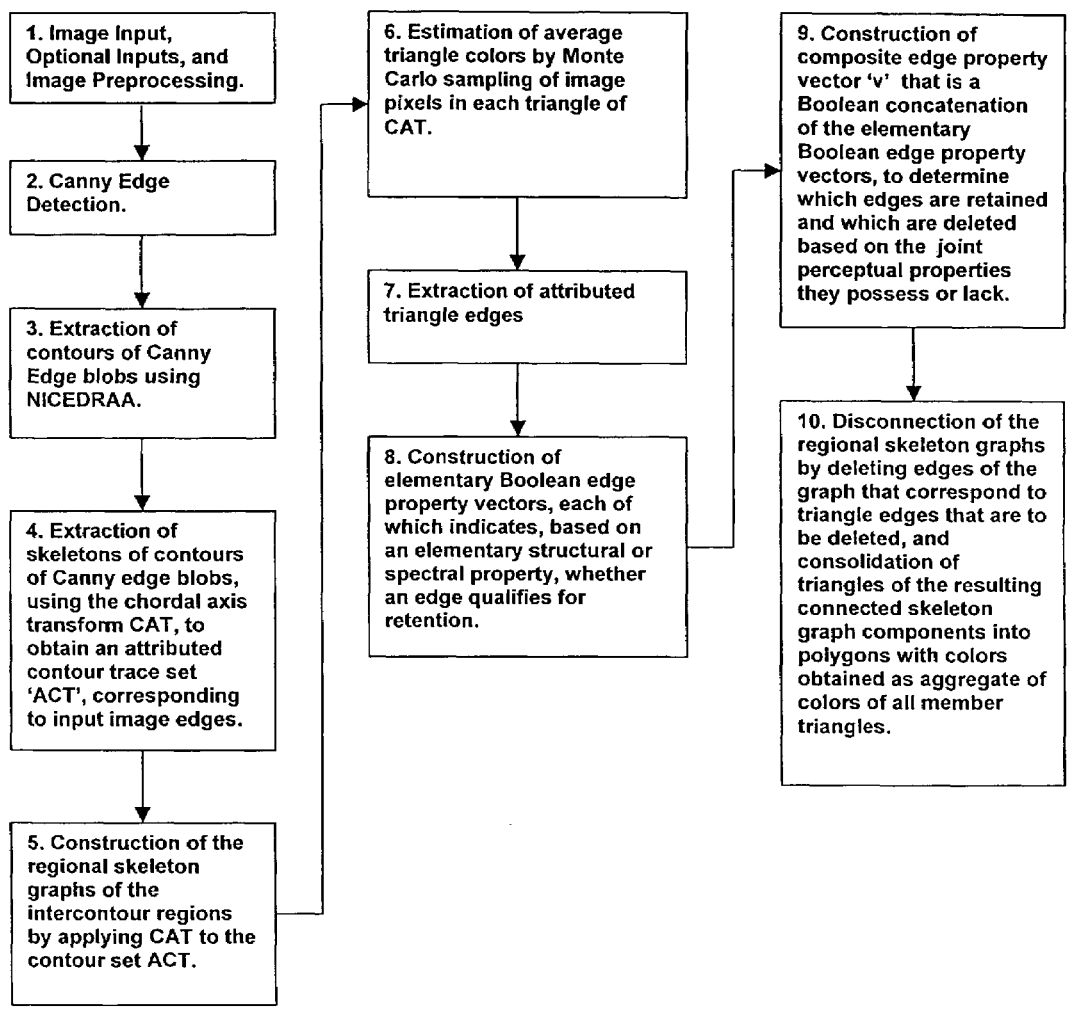
FIG. 3 is a flow chart of a second embodiment of the present invention.

An alternate variation of the algorithm scheme set forth above is depicted in FIG. 3. The following steps in FIG. 3 are the same as steps in FIG. 2, discussed above, and are not further discussed here:

| Figure | Corresponding Steps | | | | | |
|---|---|---|---|---|---|---|
| 2 | 1 | 2 | 4 | 5 | 6 | 9, 10 |
| 3 | 1 | 2 Canny edge portion | 6 | 7 | 8 | 10 |

The part of the above described algorithm (FIG. 2, Step 2) that extracts contour chains subsequent to Canny edge detection may be replaced by NICEDRAA at Step 3 ("NICEDRAA: A Method for Contour Extraction for Object Representation" (Ser. No. 10/388,680, filed Mar. 14, 2003), incorporated herein by reference) which extracts countours of contiguous Canny edge blobs, followed by a skeletonization at Steps 4 and 5 using CAT (chordal axis transform) for region skeletonization and part decomposition ("Multiscale Characterization and Analysis of Shapes" (U.S. Pat. No. 6,393,159, issued May 21, 2002)), incorporated herein by reference to obtain the desired contour chains in an alternative efficient manner that is invariant to image rotations. A NICEDRAA program listing is included on the computer disk appendix.

CAT may be applied to the contour chains (after an optional decimation of the points to improve speed as indicated in the implemented computer code provided herein) at Step 5 to obtain connected skeleton graphs of the regions delineated by the contour chains. CAT uses a constrained Delaunay triangulation to construct the skeleton graphs of the regions. A CAT program listing is included on the computer disk appendix.

The triangles so obtained can be sampled at Step 6 to estimate the color/intensity of the underlying region of the image. CAT provides a parsing of the regional ramifications into unramified subregions that may be looked upon as elemental building blocks constituting more complexly structured regions. CAT also provides connectivity information among these subregions. As in the earlier described algorithm, edges of triangles may be evaluated with respect to the various individual perceptual properties and, according to whether they satisfy the composite property v, may be retained or deleted at Steps 8, 9, and 10.

The act of deleting an edge interfacing two triangles at Step 10 amounts to cutting (disconnecting) the skeleton graph generated by CAT by eliminating an edge of the graph (this edge connects two vertices representing two adjacent triangles in the constrained Delaunay triangulation). This graph edge is transverse to the deleted triangle edge. After all edge deletions are performed, the various resulting connected skeleton graph components correspond to the different polygons segmenting the image. Thus, there is no need for a graph grouping algorithm to be applied using a connected component analysis method, as described earlier (FIG. 2, Step 8 ), making the implementation more efficient.

As mentioned above, image segmentation is a necessary precursor step in image understanding. Any computer vision system must be able to manipulate images at a high level in order to describe and track objects and events. Further, it must be able to do this in real-time. Applications of image understanding and computer vision include video surveillance, satellite and airborne reconnaissance, automated vehicular guidance and navigation, internet based search and retrieval engines for images, optical character recognition, traffic safety and monitoring, transportation and homeland security, industrial safeguards, manufacturing, and video communications to name a few. Image segmentation is a vital part of every one of these applications.

Specifically, the segmentation scheme herein may be used in any of these systems to obtain robust segmentations at desired scales and with the flexibility to adapt and specialize to system/application requirements. Such image segmentation can be used at the front end to process incoming image data and provide high-level image description that is concise and easy to use. For example, it can be used to enhance video phone technology by providing high quality rendering of select polygonal regions that correspond to faces while staying well within the bandwidth limitations of telephony. In this sense the segmentation scheme provides an object-based vector compression method that can be used to transmit relevant and meaningful parts of images instead of the whole image.

The Canny edge detector is a fast linear algorithm whose computational time complexity is a linear function of the total number of pixels in an image. The chordal axis transform uses a highly efficient contour extraction method that scales linearly with the number of contour pixels (NICEDRAA), and then employs Delaunay triangulation that runs in linear expected time as a function of the number of contour pixels. The Monte Carlo sampling of triangle intensities is linear in the number of triangles, which in turn are linear in the number of edge points. The merge procedure is again linear in the number of triangles as it uses a depth-first-search traversal of the grouping graph whose vertices are triangles. Thus the overall efficiency of the method of the present invention is high, and the method is well suited for real-time applications with proper implementation.

The foregoing description of the invention has been presented for purposes of illustration and description and is not intended to be exhaustive or to limit the invention to the precise form disclosed, and obviously many modifications and variations are possible in light of the above teaching.

The embodiments were chosen and described in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

What is claimed is:

1. A computer implemented method for segmenting a pixelated image formed of pixels having color values comprising:
   processing the image to extract edge pixels that separate different colors in said pixelated image;
   performing a constrained Delaunay triangulation of the edge pixels to form a plurality of triangles having edges that cover the pixelated image;
   determining a color for each one of the plurality of triangles from the color pixels within each triangle;
   defining a filter having a set of grouping rules related to features of the pixelated image;
   applying the filter to the plurality of triangle edges to merge adjacent triangles consistent with the filter into polygons having a plurality of vertices; and reforming the pixelated image into an array of the polygons.

2. The method of claim 1, wherein processing the pixelated image includes processing image pixels with a Canny edge detection software program.

3. The method of claim 1, determining the color of each one of the plurality of triangles includes using a Monte Carlo software program to sample color values for pixels within each triangle and then determining a mean value from sampled color values to form a color attributed to each triangle.

4. The method of claim 1, wherein the grouping rules include color similarity and structural adjacency considerations.

5. The method of claim 4, wherein the structural adjacency considerations include spacial proximity, contour continuity, and region continuity.

6. The method of claim 1, wherein each one of the polygons is identified by a vector defined by the coordinates of the vertices and a color.

7. A computer implemented method for segmenting a pixelated image formed of pixels having color values comprising:
   processing the pixelated image to extract edge pixels that separate different colors in the pixelated image to form edge contours:
   performing a constrained Delaunay triangulation of the edge pixels to form a plurality of triangles that cover the pixelated image:
   defining spatial filters that define relationships between the edge contours and edges of the triangles: and
   applying the spatial filters to the plurality of triangles to output a plurality of polygons.

8. The method of claim 7 wherein the spatial filters include spatial proximity, spectral proximity, contour continuity, and region continuity.

9. A computer implemented method for forming a compressed image from a pixelated image formed of pixels comprising:
   segmenting the pixelated image into vectorized polygonal tiles;
   processing the pixelated image to extract edge pixels that separate different colors in the pixelated image to form edge contours:
   performing a constrained Delaunay triangulation of the edge pixels to form a plurality of triangles that cover the pixelated image:
   defining spatial filters that define relationships between the edge contours and edges of the triangles:
   applying the spatial filters to the plurality of triangles to output a plurality of polygons: and
   replacing the pixelated image with the vectorized polygonal tiles to form a compressed representation of the image.

10. The method of claim 9, wherein the spatial filters include spatial proximity, spectral proximity, contour continuity, and region continuity.

* * * * *